United States Patent
Winger

(10) Patent No.: US 7,373,009 B2
(45) Date of Patent: May 13, 2008

(54) METHOD AND APPARATUS FOR EFFICIENT TRANSMISSION AND DECODING OF QUANTIZATION MATRICES

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 537 days.

(21) Appl. No.: 11/054,594

(22) Filed: Feb. 9, 2005

(65) Prior Publication Data

US 2006/0177143 A1 Aug. 10, 2006

(51) Int. Cl.
*G06K 9/36* (2006.01)
*G06K 9/38* (2006.01)

(52) U.S. Cl. .................. 382/251; 382/232; 382/233; 382/162; 382/274

(58) Field of Classification Search ......... 382/232, 382/233, 236, 245–246, 240, 251, 253; 375/240, 375/240.01, 240.03, 240.08, 240.15, 243, 375/240.22, 240.26, 245; 348/27
See application file for complete search history.

(56) References Cited

U.S. PATENT DOCUMENTS

| 5,278,647 | A  | * | 1/1994 | Hingorani et al. ...... 375/240.15 |
| 6,934,420 | B1 | * | 8/2005 | Hsu et al. .................... 382/252 |
| 6,999,511 | B1 | * | 2/2006 | Boice et al. ................. 375/240 |
| 2003/0108248 | A1 | * | 6/2003 | Huang et al. ............... 382/240 |
| 2003/0128766 | A1 | * | 7/2003 | Tahara et al. ........... 375/240.26 |
| 2006/0133478 | A1 | * | 6/2006 | Wen ....................... 375/240.03 |

* cited by examiner

*Primary Examiner*—Matthew C. Bella
*Assistant Examiner*—Ali Bayat
(74) *Attorney, Agent, or Firm*—Christopher P. Maiorana, P.C.

(57) ABSTRACT

A method for encoding quantization matrices comprising the steps of (A) signaling whether values of a luma quantization matrix are determined by either (i) a first set of custom values or (ii) a set of standardized default values, (B) transmitting the first set of custom values when the values of the luma quantization matrix are determined by the first set of custom values and (C) signaling whether values of a first chroma component quantization matrix are determined by either (i) a second set of custom values or (ii) the values of the luma quantization matrix.

21 Claims, 5 Drawing Sheets

METHOD AND APPARATUS FOR EFFICIENT TRANSMISSION AND DECODING OF QUANTIZATION MATRICES

FIELD OF THE INVENTION

The present invention relates to video compression generally and, more particularly, to a method and apparatus for efficient transmission and decoding of quantization matrices.

BACKGROUND OF THE INVENTION

Quantization matrices are commonly used in hybrid transform block-based encoder/decoders (CODECS) such as H.261/MPEG-1, H.262/MPEG-2, and MPEG-4. The quantization matrices permit frequency coefficients to be scaled at the encoder and unscaled at the decoder such that a varying level of precision can be given to different spatial frequencies. In particular, an efficient encoder often uses quantization matrices to allocate relatively more precision (and therefore relatively more bits) to lower spatial frequencies, since the human visual system is relatively more sensitive to variations in low spatial frequencies, and relatively less sensitive to variations in high spatial frequencies.

Both MPEG-1 and MPEG-2 video compression standards have two quantization tables (matrices) for 4:2:0 video. In 4:2:0 video chrominance (color) information is coded at one half the horizontal and vertical resolution of luminance (brightness) information. One quantization matrix is used for intra coding and the other quantization matrix is used for non-intra (inter) coding. The two tables are each given default values. The default intra quantization table has a distribution of quantizing values that roughly corresponds to the frequency response of the human eye when viewing an image (or picture) at a distance of six times the picture (or screen) width. The default non-intra quantization table is flat with a fixed value of 16. The constant quantization value appears at odds with the spatial frequency response of the human visual system (HVS). However, because the non-intra quantization table is used to code changes between pictures, temporal masking effects dominate the form of the table. For MPEG-2 4:2:2 and 4:4:4 video (which code chrominance at full vertical resolution) separate chrominance quantization matrices for intra and nonintra blocks can also be transmitted (or downloaded).

Various headers are used in a video stream (syntax) to specify whether (i) quantization matrices are present and specified in the following syntax of the bit stream or (ii) default matrices are to be used. Non-intra and intra quantization matrices can be separately indicated and transmitted (downloaded). In MPEG-2 a quantization matrix extension can optionally specify each of 4 potential quantization matrices: intra luma, non-intra luma, intra chroma, non-intra chroma.

ITU-T Recommendation H.264|ISO/IEC 14496-10 Advanced Video Coding Amendment 1: Fidelity Range Extensions (MPEG4-AVC FidExt, Joint Video Team (JVT) draft JVT-K047d4) operates on a similar principal to MPEG-2 (i.e., individual matrices are individually signaled to take either values that are transmitted in the bit stream or individually specified default values). MPEG4-AVC FidExt draft JVT-K047d4 does not take advantage of the fact that in practice an encoder often does not use the default values of quantization matrices (i.e., custom quantization matrices are transmitted in the bit stream), but that some duplication of the custom quantization matrices frequently occurs. MPEG4-AVC FidExt draft JVT-K047d4 has no 'fall-back rules' whereby certain matrices, if not transmitted, can assume the values of previously transmitted custom matrices for other color components.

For example, MPEG4-AVC FidExt draft JVT-K047d4 permits separate individual quantization matrices to be specified for the luminance component (Y) and both chrominance components (Cb and Cr). However, if a single custom matrix is desired for all 3 components, or even the same custom matrix for the 2 chroma components, the same matrix is signaled (transmitted) in the bit stream 3 or 2 times, respectively.

It would be desirable to have an efficient syntax for communication of quantization matrices between a video encoder and a video decoder, such that bit streams and decoders may be efficiently constructed

SUMMARY OF THE INVENTION

The present invention concerns a method for encoding quantization matrices comprising the steps of (A) signaling whether values of a luma quantization matrix are determined by either (i) a first set of custom values or (ii) a set of standardized default values, (B) transmitting the first set of custom values when the values of the luma quantization matrix are determined by the first set of custom values and (C) signaling whether values of a first chroma component quantization matrix are determined by either (i) a second set of custom values or (ii) the values of the luma quantization matrix.

The objects, features and advantages of the present invention include providing a method and apparatus for efficient transmission and decoding of quantization matrices that may (i) provide fallback rules for use when custom matrices are not specified, (ii) provide fallback rules for individual quantization matrices, (iii) provide a more efficient convention for specifying quantization matrices and/or (iv) support legacy practices.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
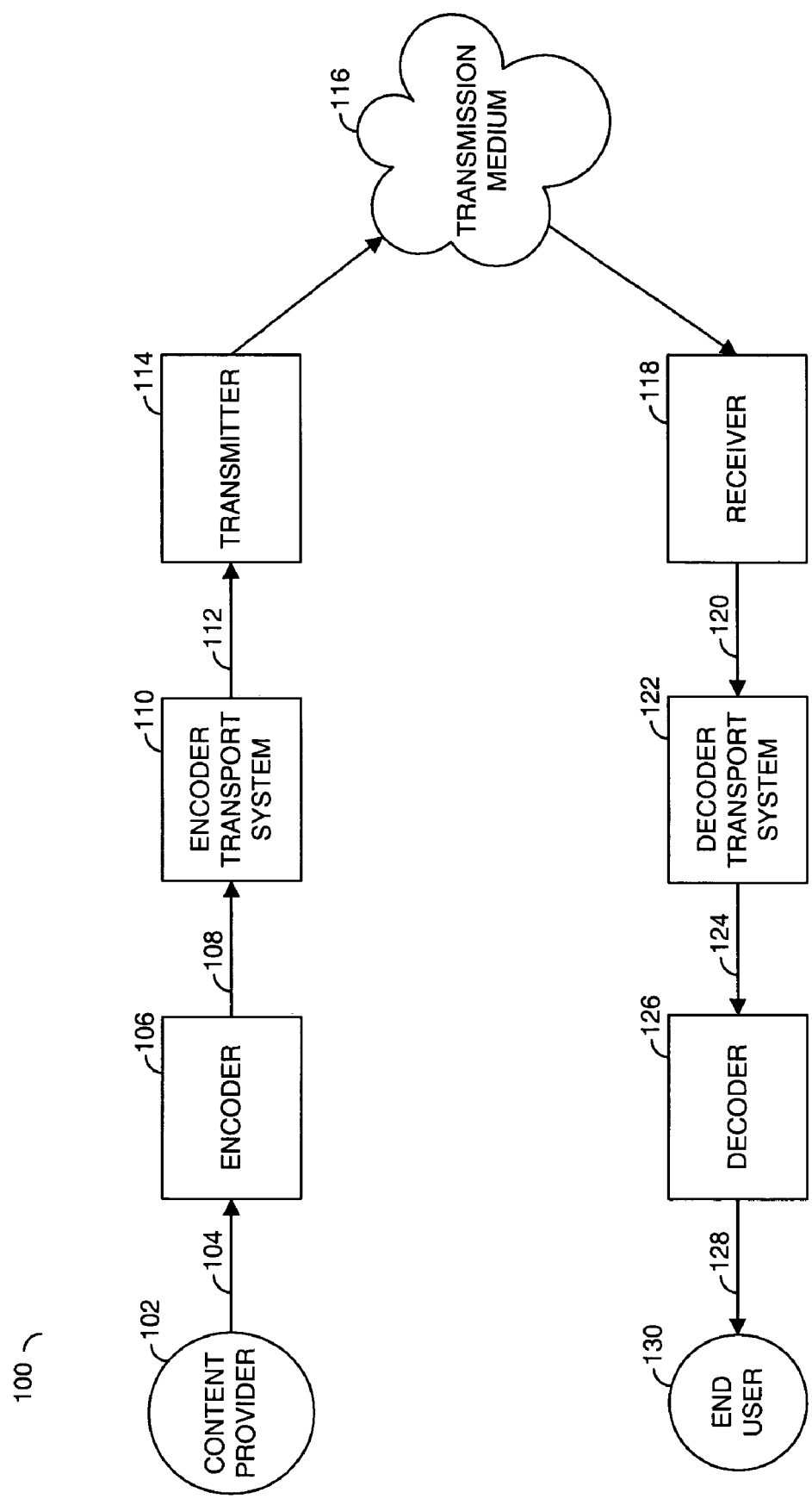
FIG. 1 is a block diagram illustrating various components of a compressed video system in accordance with a preferred embodiment of the present invention.

Referring to FIG. 1, a block diagram of a system 100 is shown illustrating components of a compressed video system in accordance with a preferred embodiment of the present invention. In general, a content provider 102 presents video image, audio or other data to be compressed and transmitted in a data stream 104 to an input of an encoder 106. The encoder 106 may be configured to generate a compressed bit stream 108 in response to the input stream 104. In one example, the encoder 106 may be configured to encode the data stream 104 according to one or more encoding standards (e.g., MPEG-1, MPEG-2, MPEG-4, WMV, WM9, VC-9, VC-1, H.262, H.263, H.264, H.264/JVC/AVC/MPEG-4 part 10, AVS 1.0 and/or other standards for compression of audio-video data). The encoder 106 may be further configured to generate the bit stream 108 using a quantization process implemented with support for default and custom scaling matrices in accordance with the present invention.

The compressed bit stream 108 from the encoder 106 may be presented to an encoder transport system 110. An output of the encoder transport system 110 generally presents a signal 112 to a transmitter 114. The transmitter 114 transmits the compressed data via a transmission medium 116. In one example, the content provider 102 may comprise a video broadcast, DVD, or any other source of video data stream. The transmission medium 116 may comprise, for example, a broadcast, cable, satellite, network, DVD, hard drive, or any other medium implemented to carry, transfer, and/or store a compressed bit stream.

On a receiving side of the system 100, a receiver 118 generally receives the compressed data bit stream from the transmission medium 116. The receiver 118 presents an encoded bit stream 120 to a decoder transport system 122. The decoder transport system 122 generally presents the encoded bit stream via a link 124 to a decoder 126. The decoder 126 generally decompresses (decodes) the data bit stream and presents the data via a link 128 to an end user hardware block (or circuit) 130. The end user hardware block 130 may comprise a television, a monitor, a computer, a projector, a hard drive, a personal video recorder (PVR), an optical disk recorder (e.g., DVD), or any other medium implemented to carry, transfer, present, display and/or store the uncompressed bit stream (e.g., decoded video signal).

Figure 2:
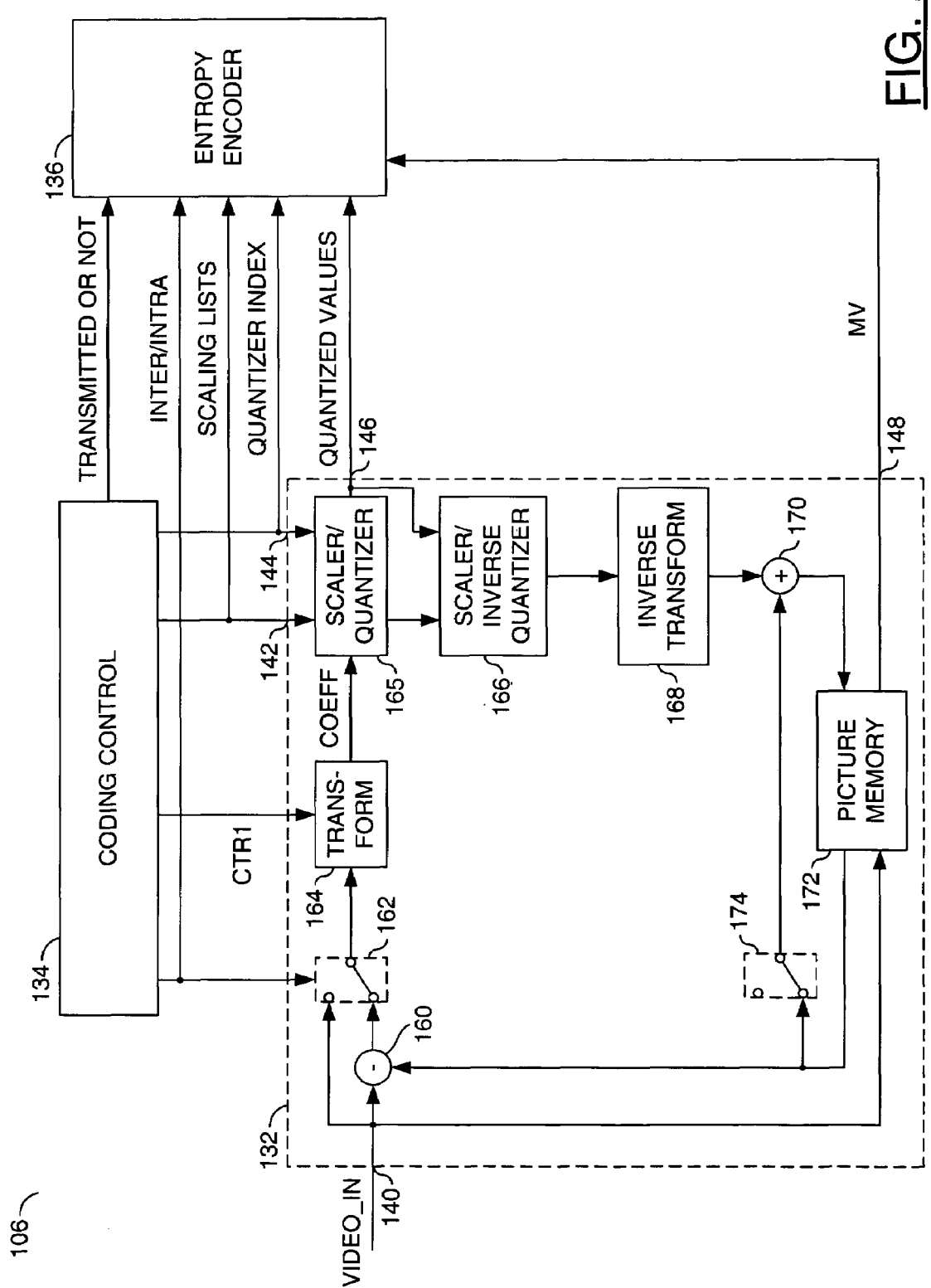
FIG. 2 is a more detailed block diagram illustrating a video encoder/decoder (CODEC) in accordance with a preferred embodiment of the present invention.

Referring to FIG. 2, a more detailed block diagram of the circuit 106 of FIG. 1 implemented in accordance with a preferred embodiment of the present invention is shown. The circuit 106 may be implemented, in one example, as a video encoder. In one example, the circuit 106 may be compliant with version 3 of the H.264/MPEG4-AVC FidExt standard, as found in Joint Video Team (JVT) document JVT-L050d5, draft "ITU-T Recommendation H.264 and ISO/IEC 14496-10:2004 (MPEG-4 Part 10) Advanced Video Coding", which is hereby incorporated by reference in its entirety. The circuit 106 may also be compliant with one or more other compression standards or methods (e.g., H.264, VC1, and/or other specifications). The present invention generally relates to encoding rules for scaling matrices utilized during quantization and/or inverse quantization. The present invention generally provides a flexible design for signaling custom or default values for quantization matrices in standard based video encoding. The circuit 106 may comprise a circuit (or block) 132, a circuit (or block) 134 and a circuit (or block) 136. The block 132 may be implemented, in one example, as an encoder/decoder (CODEC) circuit. The block 134 may be implemented as a coding control circuit. The block 136 may be implemented as an entropy coding block.

The circuit 132 may have an input 140 that may receive a signal (e.g., VIDEO IN), an input 142 that may receive a signal (e.g., SCALING LISTS), an input 144 that may receive a signal (e.g., QUANTIZER INDEX), an output 146 that may present a signal (e.g., QUANTIZED VALUES) and an output 148 that may present a signal (e.g., MV). The signal VIDEO IN may comprise a video bit stream. The signal SCALING LISTS may comprise custom values for one or more matrices. The signal QUANTIZED VALUES may comprise a number of quantized values for transform coefficients. The signal MV may comprise a number of motion vectors. The block 132 may be configured to generate the signal QUANTIZED VALUES and the signal MV in response to the signal VIDEO IN, the signal SCALING LISTS and one or more control signals (e.g., CTR1 and INTER/INTRA) received from the block 134. In general, the block 132 may be implemented with conventional techniques.

The circuit 134 may have a first output that may present the control signal CTR1, a second output that may present the signal SCALING LISTS, a third output that may present the signal QUANTIZER INDEX, a fourth output that may present the signal INTER/INTRA and a fifth output that may present a signal (e.g., TRANSMITTED OR NOT). The signal INTER/INTRA may be implemented, in one example, as a decision flag. The signal TRANSMITTED OR NOT may be implemented, in one example, as a status flag.

In one example, the signal TRANSMITTED OR NOT may be configured to indicate whether one or more scaling lists are transmitted (or present) in a bit stream. For example, the signal TRANSMITTED OR NOT may have a first state (e.g., a custom state) and a second state (e.g., a default state) corresponding to each of the scaling lists implemented. The custom state may be configured to indicate the presence in the bit stream of custom values for a particular quantization matrix. The default state may be configured to indicate the absence from the bit stream of custom values for the particular matrix. The signal TRANSMITTED OR NOT may be implemented to provide indications for more than one quantization matrix. In one example, the signal TRANSMITTED OR NOT may be implemented as a sequence scaling list present flag.

The signal CTR1 may be configured, in one example, to control a transformation process of the block 132. For example, the signal CTR1 may be configured to select between 8×8 and 4×4 transforms. The circuit 134 may be configured, in one example, to generate the signals CTR1, INTER/INTRA, TRANSMITTED OR NOT, and QUANTIZER INDEX according to conventional techniques. The circuit 134 may be further configured, in one example, to generate the signal SCALING LISTS in accordance with the present invention.

The block 136 may be implemented using conventional techniques. In one example, the block 136 may be configured to generate a compressed bit stream using one or more of variable length codes (VLC), context-adaptive variable length coding (CAVLC) and/or context-adaptive binary arithmetic coding (CABAC). The block 136 may be configured to generate the compressed bit stream in response to the signals INTER/INTRA, TRANSMITTED OR NOT, SCALING LISTS, QUANTIZER INDEX, QUANTIZED VALUES and MV.

In one example, the circuit 132 may comprise a block (or circuit) 160, a block (or circuit) 162, a block (or circuit) 164, a block (or circuit) 165, a block (or circuit) 166, a block (or circuit) 168, a block (or circuit) 170, a block (or circuit) 172 and a block (or circuit) 174. The block 160 may be implemented as a subtractor. The block 162 may be implemented as a multiplexer (or selector) circuit. The block 164 may be implemented as a transform block. The block 165 may be implemented as a scaler/quantizer block. The block 166 may be implemented as a scaler/inverse quantizer block. The block 168 may be implemented as an inverse transform block. The block 170 may be implemented as an adder. The block 172 may be implemented as a picture memory. The block 174 may be implemented as a multiplexer (or selector) circuit. Other blocks or circuits may be implemented accordingly to meet the design criteria of a particular implementation.

The signal VIDEO_IN may be presented to a first input of the block 160 and a first input of the block 162. An output of the block 160 may present a signal to a second input of the block 162. The block 162 may be configured to couple either the first input or the second input to an output in response to the signal INTER/INTRA. The output of the block 162 may be presented to an input of the block 164. The block 164 may be configured to transform the signal received from the block 162 based upon the signal CTR1. An output of the block 164 may present a signal (e.g., COEFF) to an input of the block 165.

The circuit 165 may have a first input that may receive the signal COEFF, a second input that may receive the signal SCALING LISTS, a third input that may receive the signal QUANTIZER INDEX and an output that may present the signal QUANTIZED VALUES. The signals SCALING LISTS and QUANTIZER INDEX may be configured to signal (or set) values of one or more scaling matrices of the circuit 165. The circuit 165 may be configured to generate the signal QUANTIZED VALUES in response to the signal COEFF, the signal SCALING LISTS and the signal QUANTIZER INDEX.

The block 166 may have a first input that may receive the signal QUANTIZED VALUES and a second input that may receive the signal SCALING LISTS. An output of the block 166 may be presented to an input of the block 168. An output of the block 168 may be presented to a first input of the block 170. An output of the block 170 may be presented to a first input of the block 172. The block 172 may have a first output that may present the signal MV, a second input that may receive the signal VIDEO IN and a second output that may present a signal to a second input of the block 160 and a first input of the block 174. An output of the block 174 may be presented to a second input of the block 170. The blocks 160-174 may be implemented using conventional techniques for block-based video encoders. Motion estimation and compensation may be implemented with conventional techniques. However, the implementation of motion estimation and compensation may vary substantially from one encoder to another encoder to meet the design criteria of a particular implementation.

Video compression standards (e.g., MPEG2, MPEG4, H.264, VC1, etc.) generally define a video decoder syntax and decoding process. As part of the decoding process, inverse quantization is generally defined in the standard. However, video encoding implementation is generally more flexible. For example, different encoders may implement forward quantization rules differently. Quantization as used herein generally refers to the process of assigning a range of coefficient levels to a predetermined reconstructed level that may be obtained from a quantization parameter.

Figure 3:
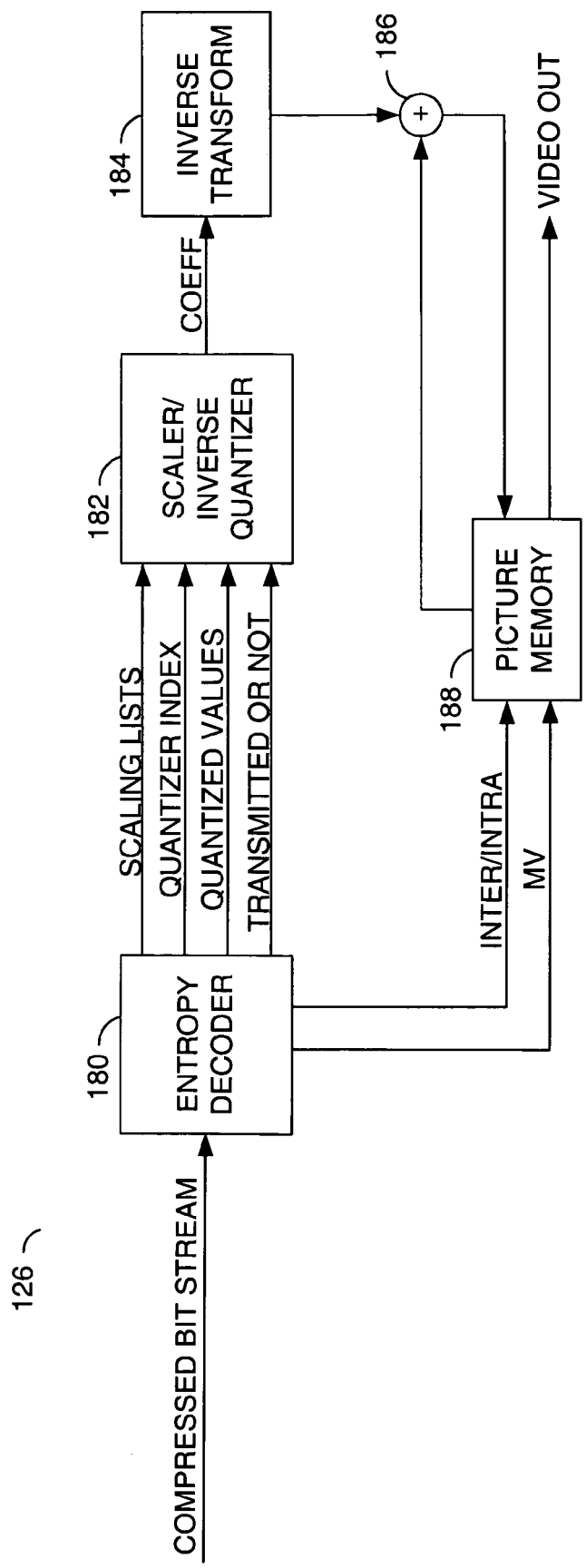
FIG. 3 is a more detailed block diagram illustrating a video decoder in accordance with a preferred embodiment of the present invention.

Referring to FIG. 3, a more detailed block diagram of the circuit 126 of FIG. 1 implemented in accordance with a preferred embodiment of the present invention is shown. The circuit 126 may be implemented, in one example, as a video decoder. The circuit 126 may be implemented as part of a DVD player, personal video recorder (PVR) or other device configured to playback a compressed video bit stream. In one example, the circuit 126 may be compliant with version 3 of the H.264/MPEG4-AVC FidExt standard, as found in Joint Video Team (JVT) document JVT-L050d5, draft "ITU-T Recommendation H.264 and ISO/IEC 14496-10:2004 (MPEG-4 Part 10) Advanced Video Coding." The circuit 126 may also be compliant with one or more other compression standards or methods (e.g., H.264, VC1, and/or other specifications).

The decoder 126 in FIG. 1 may be implemented similarly to the encoder 106, but operate in reverse, as would be recognized by a person of ordinary skill in the art. In one example, the decoder 126 may comprise a circuit (or block 180), a circuit (or block 182), a circuit (or block 184), a circuit (or block 186) and a circuit (or block 188). The block 180 may be implemented as an entropy decoder block. The block 182 may be implemented as a scaler and inverse quantizer block. The block 184 may be implemented as an inverse transform block. The block 186 may be implemented as an adder block. The block 188 may be implemented as a picture memory. In one example, the block 188 may be configured to implement motion compensation in response to information (e.g., motion vectors) recovered from the compressed bit stream. The blocks 180-188 may be implemented using conventional techniques modified in accordance with the teachings of the present invention. In one example, the blocks 182-188 may be implemented similarly to the blocks (or processing elements) 166-172 of FIG. 2.

The circuit 180 may be configured to recover the signals TRANSMITTED OR NOT, QUANTIZED VALUES, QUANTIZER INDEX, SCALING LISTS, INTER/INTRA and MV from a compressed bit stream generated in accordance with the present invention. The circuit 180 may have an input that may receive the compressed bit stream, a first output that may present the signal SCALING LISTS, a second output that may present the signal QUANTIZER INDEX, a third output that may present the signal QUANTIZED VALUES, a fourth output that may present the signal TRANSMITTED OR NOT, a fifth output that may present the signal INTER/INTRA and a sixth output that may present the signal MV. The circuit 182 may be configured to generate (or recover) coefficients (e.g., the signal COEFF) in response to one or more of the signals SCALING LISTS, QUANTIZER INDEX, QUANTIZED VALUES and TRANSMITTED OR NOT.

The circuit 184 may have an input that may receive the signal COEFF and an output that may present a signal to a first input of the circuit 186. The circuit 186 may have an output that may present a signal to a first input of the block 188. The block 188 may have a second input that may receive the signal INTER/INTRA, a third input that may receive the signal MV and an output that may present a signal to a second input of the circuit 186.

Figure 4:
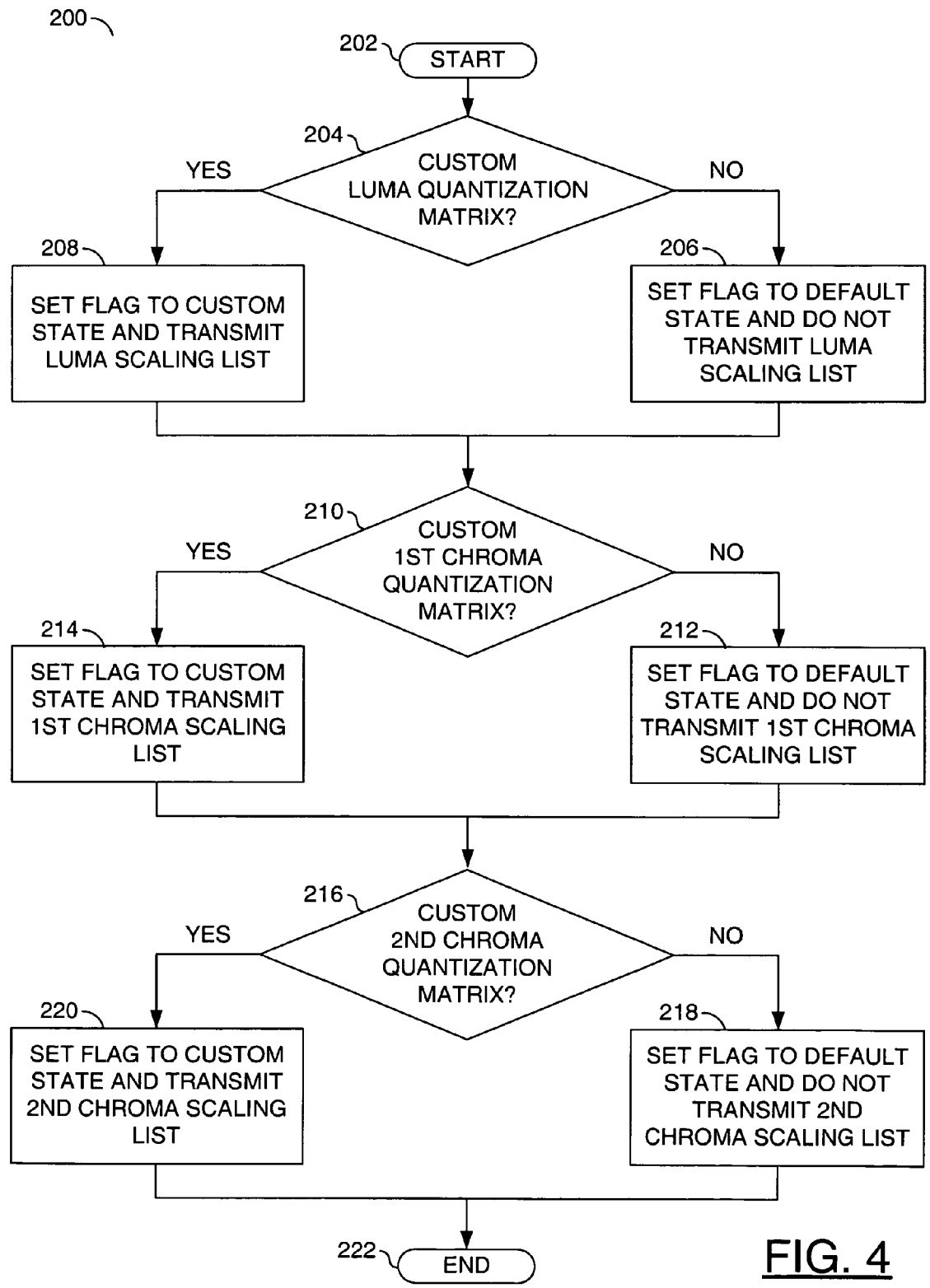
FIG. 4 is a flow diagram illustrating an encoding process in accordance with a preferred embodiment of the present invention.

Referring to FIG. 4, a flow diagram 200 is shown illustrating an example encoding process in accordance with a preferred embodiment of the present invention. The process for encoding quantization matrices may begin with a state 202. The process 200 generally moves to a state 204 in which the encoder determines whether a custom set of values should be used for a luma quantization matrix. If a custom set of values is not to be used, a custom/default flag is generally set to a default state and no scaling list is transmitted (e.g., the block 206). If a custom luma quantization matrix is to be used, the process 200 generally sets the custom/default flag to the custom state and transmits the custom scaling list for the luma quantization matrix (e.g., the block 208).

The process 200 generally moves to a state 210 in which a determination is made whether a custom first chroma component quantization matrix is to be used. If a custom first chroma quantization matrix is not to be used, the process 200 generally sets the appropriate custom/default flag to the default state and no scaling matrix is transmitted for the first chroma quantization matrix (e.g., the block 212). If a custom first chroma component quantization matrix is to be used, the process 200 generally sets the appropriate custom/default flag to the custom state and transmits the scaling list for the first chroma component quantization matrix (e.g., the block 214).

The process 200 may move to a state 216 or end. When the process 200 moves to the state 216, a determination is made whether a custom second chroma component quantization matrix is to be used. If a custom second chroma component quantization matrix is not to be used, the process 200 generally sets the appropriate custom/default flag to the default state and no scaling list is transmitted for the second chroma component quantization matrix (e.g., the block 218). If a custom second chroma component quantization matrix is to be used, the process 200 generally sets the associated custom/default flag to the custom state and transmits the scaling list for the second chroma component quantization matrix (e.g., the block 220). Once the state for each of the quantization matrices has been set, the process 200 generally ends (e.g., the block 222).

Figure 5:
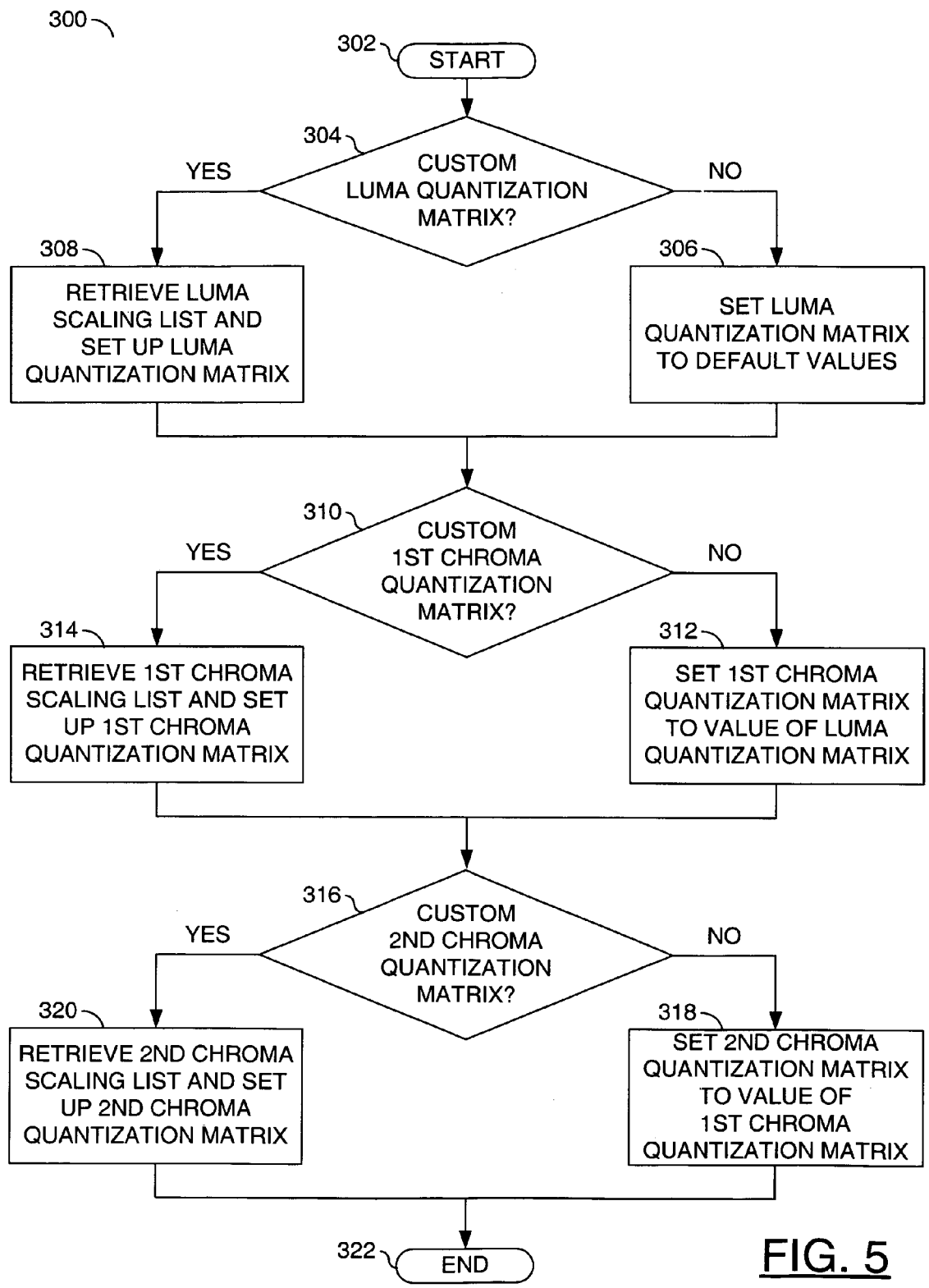
FIG. 5 is a flow diagram illustrating a decoding process in accordance with a preferred embodiment of the present invention.

Referring to FIG. 5, a flow diagram 300 is shown illustrating an example decoding process in accordance with a preferred embodiment of the present invention. The decoding process 300 generally starts in a state 302. The decoding process 300 generally moves to a state 304 in which a determination is made whether a luma quantization matrix is to take on custom values or use default standardized values (e.g., the block 304). When the bit stream signals that the luma quantization matrix is to use default values, the process 300 generally sets the luma quantization matrix using default values (e.g., the block 306). If the bit stream signals that the luma quantization matrix is to take on custom values, the process 300 generally determines the custom values by retrieving associated scaling list from the bit stream (e.g., the block 308).

The process 300 generally continues by determining whether a first chroma component quantization matrix is to have custom values or default standard values (e.g., the block 310). When the first chroma component quantization matrix is to take on default values, the process 300 generally sets the first chroma component quantization matrix based on the values of the luma quantization matrix (e.g., the block 312). When the first chroma component quantization matrix is to have custom values, the process 300 generally retrieves the custom values from the bit stream (e.g., the block 314).

The process 300 generally continues by determining whether a second chroma component quantization matrix is to have custom or default values (e.g., the block 316). When the second chroma component quantization matrix is signaled as having default values, the process 300 generally sets the values of the second chroma component quantization matrix to the values of the first chroma component quantization matrix (e.g., the block 318). When the second chroma component quantization matrix is to have custom values, the process 300 generally sets the values of the second chroma component quantization matrix based on values in an associated scaling list retrieved from the bit stream (e.g., the block 320). The process 300 generally ends once the respective quantization matrices have been determined (e.g., the block 322).

The encoding and decoding processes may be configured to use 4×4 and/or 8×8 block sizes and inter or intra prediction modes. In one example, the values of the respective scaling lists (quantization matrices) may be determined according to a set of fallback rules, which incorporates rules in accordance with the present invention, as summarized in the following TABLE 1:

TABLE 1

| Value of scaling list index | Mnemonic name | Block size | MB prediction type | Component | Scaling list fall-back rule set A | Scaling list fall-back rule set B | Default scaling list |
|---|---|---|---|---|---|---|---|
| 0 | Sl_4×4_Intra_Y | 4 × 4 | Intra | Y | default scaling list | sequence-level scaling list | Default_4×4_Intra |
| 1 | Sl_4×4_Intra_Cb | 4 × 4 | Intra | Cb | scaling list for i = 0 | scaling list for i = 0 | Default_4×4_Intra |
| 2 | Sl_4×4_Intra_Cr | 4 × 4 | Intra | Cr | scaling list for i = 1 | scaling list for i = 1 | Default_4×4_Intra |
| 3 | Sl_4×4_Inter_Y | 4 × 4 | Inter | Y | default scaling list | sequence-level scaling list | Default_4×4_Inter |
| 4 | Sl_4×4_Inter_Cb | 4 × 4 | Inter | Cb | scaling list for i = 3 | scaling list for i = 3 | Default_4×4_Inter |
| 5 | Sl_4×4_Inter_Cr | 4 × 4 | Inter | Cr | scaling list for i = 4 | scaling list for i = 4 | Default_4×4_Inter |
| 6 | Sl_8×8_Intra_Y | 8 × 8 | Intra | Y | default scaling list | sequence-level scaling list | Default_8×8_Intra |
| 7 | Sl_8×8_Inter_Y | 8 × 8 | Inter | Y | default scaling list | sequence-level scaling list | Default_8×8_Intra |

In general, encoding and decoding processes implemented in accordance with the present invention provide fall-back rules of the form scaling list for i=scaling list for (i−1), where i represents the value of the current scaling list index.

The present invention generally specifies that in a bit stream the luma quantization matrixes may be signaled to either assume custom values specified in further syntax that follows, or may be signaled to assume standardized default values. The present invention may further specify that the type of values (e.g., custom or default) used in a quantization matrix for the chrominance components may be signaled (through bit stream syntax) such that one of the chrominance components (preferably Cb) may either (i) assume custom values specified in further following syntax or (ii) be specified to assume the values taken by the preceding luminance (luma) quantization matrix, which were derived according to the method described above. Furthermore, the other (second) chrominance component (preferably Cr) may be signaled (with bit stream syntax) to either (i) assume custom values specified in further following syntax or (ii) assume the values taken by the preceding chrominance (chroma) quantization matrix, which were derived according to the method of the above paragraphs.

The present invention generally implements fallback rules, which may be used when a custom matrix is not specified for chroma color components, whereby chroma matrices may be derived from previously specified chroma and/or luma quantization matrices (which may be either custom or default). The present invention may provide an extremely efficient convention for specifying identical custom values for color component quantization matrices while still providing the possibility of fully custom matrices for each color component.

Conventional solutions for MPEG-1 and MPEG-2 4:2:0 weighting matrices use identical custom or default quantization matrices for all 3 luminance and chrominance color components of a video stream. Conventional solutions are inefficient because identical individual custom matrices are transmitted for each of the 3 color components. However, the conventional solution for MPEG4-AVC does permit each of the 3 color components to be specified to assume unique custom values specified in the bit stream, which is a degree of flexibility that was not possible with earlier video standards (e.g., MPEG-1 and MPEG-2).

Efficient bit streams generally do not use excess bits to represent perceptually relevant video information. Efficient decoders generally do not use excessively complex parsing of the bit stream, particularly for the decoding of redundant information. In video bit streams conforming to video standards, the specification of redundant information is generally not desirable. Therefore, efficient semantical rules (conventions) for specifying information that is conventionally frequently redundant is desirable in order to have an efficient syntax. The present invention generally provides an advantage of efficient bit streams and efficient decoding.

The present invention generally permits legacy methods for use and specification of quantization matrices to be signaled efficiently in an H.264-AVC FidExt bit stream. For example, with only two indications in the syntax (one for Cb and one for Cr) that individually specify the use of a fall-back rule for each color component, the present invention may specify the use of the MPEG-2/MPEG-1 4:2:0 method, in which all 3 color components (Y/Cb/Cr) assume the values of a single custom matrix. Furthermore, the legacy method used by MPEG-2 4:2:2 and 4:4:4 video, in which a unique custom matrix is used for luma (Y) and a single unique custom matrix may be specified and used for both chroma (Cb and Cr) components, may be specified efficiently. For example, the first bit stream indicator above (preferably for Cb) may specify that a custom matrix is used for the first chroma matrix (rather than the fall-back rule) and the second bit stream indicator (preferably for Cr) may specify that the fall-back rule is used for the second chroma matrix such that, the second chroma matrix uses the same custom matrix as the first chroma matrix. The present invention generally also permits fully custom matrices to be specified for each individual color component.

The present invention generally provides a more efficient convention for specifying all 3 legacy (standard industry practice) methods for specifying quantization matrices (MPEG-1/2 4:2:0, MPEG-2 4:2:2/4:4:4 and MPEG4-AVC FidExt). Through the use of the specified 'fall-back' rules, single indicators in the bit stream may specify that duplicate custom quantization matrices are or are not to be used (e.g., according to the conventions of legacy standard industry practice). The fall-back rules of the present invention are configured such that the duplicate matrix values themselves need not be further specified in the bit stream syntax.

The present invention may be used for still pictures, stereo video, stereo pictures, 3D-video, 3D-still pictures, etc. In one embodiment, the present invention is primarily concerned with a method for specifying video and or image decoding. The present invention may be used in conjunction with differential specification of quantization matrices from quantization matrices that occur earlier in the bit stream (and are therefore common knowledge to both the encoder and the decoder).

The functions illustrated by the diagrams of FIGS. 1-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of application specific integrated circuits (ASICs), application specific standard products (ASSPs), field programmable gate arrays (FPGAs) or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for encoding quantization matrices comprising the steps of:
    transmitting a first signal corresponding to a status of a
      luma quantization matrix, wherein said first signal has a first state when values of said luma quantization matrix are determined by a first set of custom values and a second state when values of said luma quantization matrix are determined by a set of standardized default values;

transmitting said first set of custom values when said values of said luma quantization matrix are determined by said first set of custom values; and transmitting a second signal corresponding to a status of a first chroma component quantization matrix, wherein said second signal has a first state when values of said first chroma component quantization matrix are determined by a second set of custom values and a second state when values of said first chroma component quantization matrix are determined by said values of said luma quantization matrix.

2. The method according to claim 1, further comprising the step of:

transmitting a third signal corresponding to a status of a second chroma component quantization matrix, wherein said third signal has a first state when values of said second chroma component quantization matrix are determined by a third set of custom values and a second state when values of said second chroma component quantization matrix are determined by said values of said first chroma component quantization matrix.

3. The method according to claim 2, wherein said first set of custom values is specified in syntax of a bit stream.

4. The method according to claim 3, wherein said second set of custom values is specified in syntax of said bit stream.

5. The method according to claim 2, wherein said third set of custom values is specified in syntax of a bit stream.

6. An encoder configured to:

transmit a first signal corresponding to a status of a luma quantization matrix, wherein said first signal has a first state when values of said luma quantization matrix are determined by a first set of custom values and a second state when values of said luma quantization matrix are determined by a set of standardized default values;

transmit said first set of custom values when said values of said luma quantization matrix are determined by said first set of custom values; and transmit a second signal corresponding to a status of a first chroma component quantization matrix, wherein said second signal has a first state when values of said first chroma component quantization matrix are determined by a second set of custom values and a second state when values of said first chroma component quantization matrix are determined by said values of said luma quantization matrix.

7. The encoder according to claim 6, further configured to:

transmit a third signal corresponding to a status of a second chroma component quantization matrix, wherein said third signal has a first state when values of said second chroma component quantization matrix are determined by a third set of custom values and a second state when values of said second chroma component quantization matrix are determined by said values of said first chroma component quantization matrix.

8. The encoder according to claim 7, further configured to transmit said first set of custom values in syntax of a bit stream.

9. The encoder according to claim 8, further configured to transmit said second set of custom values in said syntax of said bit stream.

10. The encoder according to claim 7, further configured to transmit said third set of custom values in syntax of a bit stream.

11. A method for decoding quantization matrices comprising the steps of:

setting values of a luma quantization matrix based upon a state of a first signal corresponding to a status of said luma quantization matrix, wherein when said first signal is in a first state said values of said luma quantization matrix are determined by a first set of custom values and when said first signal is in a second state said values of said luma quantization matrix are determined by standardized default values;

retrieving said first set of custom values when said values of said luma quantization matrix are determined by said first set of custom values; and setting values of a first chroma component quantization matrix based upon a state of a second signal corresponding to a status of said first chroma component quantization matrix, wherein when said second signal is in a first state said values of said first chroma component quantization matrix are determined by a second set of custom values and when said second signal is in a second state said values of said first chroma component quantization matrix are determined by the values assigned to the luma quantization matrix.

12. The method according to claim 11, further comprising the step of:

setting values of a second chroma component quantization matrix based upon a state of a third signal corresponding to a status of said second chroma component quantization matrix, wherein when said third signal is in a first state said values of said second chroma component quantization matrix are determined by a third set of custom values and when said third signal is in a second state said values of said second chroma component quantization matrix are determined by the values assigned to said first chroma component quantization matrix.

13. The method according to claim 12, wherein said first set of custom values is retrieved from syntax of a bit stream.

14. The method according to claim 13, wherein said second set of custom values is retrieved from syntax of said bit stream.

15. The method according to claim 12, wherein said third set of custom values is retrieved from syntax of a bit stream.

16. A decoder configured to:

set values of a luma quantization matrix based upon a state of a first signal corresponding to a status of said luma quantization matrix, wherein when said first signal is in a first state said values of said luma quantization matrix are determined by a first set of custom values and when said first signal is in a second state said values of said luma quantization matrix are determined by standardized default values;

retrieve said first set of custom values when said values of said luma quantization matrix are determined by said first set of custom values; and set values of a first chroma component quantization matrix based upon a state of a second signal corresponding to a status of said first chroma component quantization matrix, wherein when said second signal is in a first state said values of said first chroma component quantization matrix are determined by a second set of custom values and when said second signal is in a second state said values of said first chroma component quantization matrix are determined by the values assigned to the luma quantization matrix.

17. The decoder according to claim 16, further configured to:
set values of a second chroma component quantization matrix based upon a state of a third signal corresponding to a status of said second chroma component quantization matrix, wherein when said third signal is in a first state said values of said second chroma component quantization matrix are determined by a third set of custom values and when said third signal is in a second state said values of said second chroma component quantization matrix are determined by the values assigned to said first chroma component quantization matrix.

18. The decoder according to claim 17, further configured to detect and retrieve said first set of custom values in syntax of a bit stream.

19. The decoder according to claim 18, further configured to detect and retrieve said second set of custom values in said syntax of said bit stream.

20. The decoder according to claim 17, further configured to detect and retrieve said third set of custom values in syntax of a bit stream.

21. The method according to claim 1, wherein said first chroma component corresponds to a Cb chrominance component and said second chroma component corresponds to a Cr chrominance component.

* * * * *